Patented Sept. 16, 1947

2,427,579

UNITED STATES PATENT OFFICE 2,427,579

3,4-DIHYDROPYRANOCOUMARINS AND PROCESS OF MAKING THEM

Mark A. Stahmann, New York, N. Y., and Miyoshi Ikawa and Karl Paul Link, Madison, Wis., assignors to Wisconsin Alumni Research Foundation, Madison, Wis., a corporation of Wisconsin No Drawing. Application April 2, 1945, Serial No. 586,048

20 Claims. (Cl. 260—333)

1

Our invention relates to certain new 3,4-dihydropyranocoumarins, which have anti-coagulant properties; and to the process of making them.

Our new 3,4-dihydropyranocoumarins have the following general formula:

(1) 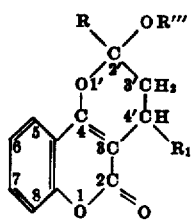

in which R represents a member of the class consisting of alkyl groups (most desirably the methyl group), the phenyl group, and hydroxy-substituted phenyl groups; R' represents a member of the class consisting of alkyl groups (most desirably the methyl group), the phenyl group, and phenyl groups containing a substituent of the class consisting of the hydroxy group and the methoxy group in at least one of the para and meta positions; and R''' represents a lower-alkyl group.

These new 3,4-dihydropyranocoumarins may have other names. They may be referred to as cyclic ketals. They may also be referred to as derivatives of 5-oxo-di-hydropyrano(3,2—c)(1)-benzopyran.

In producing our new 3,4-dihydropyranocoumarins, we cause a reaction with an alcohol, desirably acidulated alcohol, of a 3-substituted 4-hydroxycoumarin of the following general formula:

(2) 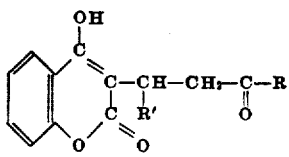

in which R and R' have the same meaning as before. Those 3-substituted 4-hydroxycoumarins, themselves, have anti-coagulant properties; and form the subject-matter of our co-pending application Serial No. 586,047, filed April 2, 1945. The reaction of the present case, involving an addition of alcohol and an elimination of water, may be carried out either on the separated 3-substituted 4-hydroxycoumarins, or may be carried out as a continuation of the reaction of our aforesaid co-pending application without separation of the 3-substituted 4-hydroxycoumarin.

The general reaction of the present application is indicated by the following equation:

(3) 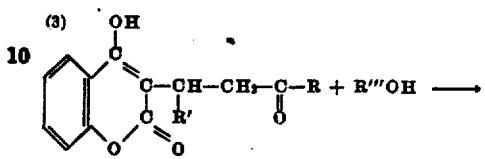 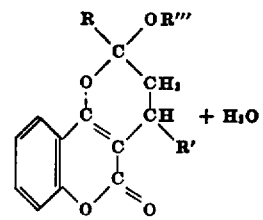

in which R''' is the alkyl group of the alcohol. The reaction is desirably carried out in an excess of the alcohol as a solvent; and is desirably carried out in the presence of an acid, which acts as a catalyst. The acid is conveniently hydrochloric acid, present in a concentration of about 4%. In addition, we find it desirable to carry out the reaction at elevated temperature, although it will go slowly at room temperature; and we conveniently produce the elevated temperature by refluxing.

In the preferred manner of carrying out our process, we reflux one part of the initial 3-substituted 4-hydroxycoumarin of Formula 2 with about ten parts of a chosen absolute alkanol (most conveniently methanol or ethanol) containing about 4% hydrochloric acid; by which term, whenever used, we mean 4% by weight of the alkanol solution. The refluxing times may vary widely, from one-quarter hour to about twenty-four hours. After the refluxing, the reaction mixture is cooled, whereupon in many cases the reaction product separates out of solution and may be recovered by decantation or filtration; but if the cooling does not produce the separation of the reaction product that separation is effected by the addition of water, usually several volumes. In most cases the separated product is a solid, but sometimes it is an oil. In either case it may be recrystallized from ethanol, to give a white crystalline solid.

If desired, as already noted, we may carry out our process as a continuation of the process of our aforesaid co-pending application Serial No. 586,047, without separation of the 3-substituted 4-hydroxycoumarin (of Formula 2) produced in accordance with that application. In that event, the course of the general reaction is first to condense 4-hydroxycoumarin with an α,β-unsaturated ketone of the type indicated in the equation just below, and then to produce a reaction of the product of that condensation with the desired alcohol. The course of the combined reaction is indicated by the following equation:

(4)
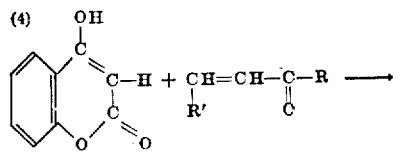

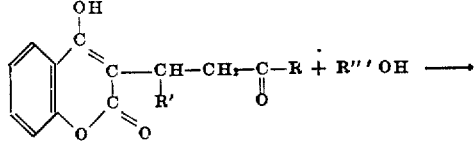

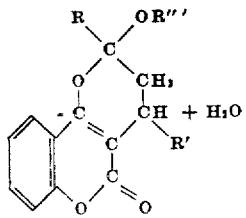

In the foregoing combined equation, the condensation of the 4-hydroxycoumarin with the α,β-unsaturated ketone, constituting the first part of the combined equation, is a Michael-type addition reaction, which with the product obtained from it is the subject-matter of our aforesaid co-pending application; while the second part of the combined equation is the same as Equation 3 above, and involves a ring-closure with the addition of alcohol and the elimination of water to produce the 3,4-dihydropyranocoumarins of this application.

The following are examples of our invention:

*Example 1.—3,4-(2'-methyl-2'-methoxy-4'-methyl)dihydropyranocoumarin*

About 1 gram of 3-(1'-methyl-2'-acetyl)ethyl-4-hydroxycoumarin—prepared as set forth in our aforesaid co-pending application by the condensation in pyridine of equimolecular amounts of 4-hydroxycoumarin and ethylidene acetone—and 10 grams of absolute methanol containing about 4% hydrochloric acid, are refluxed together for about an hour. Then the reaction mixture is allowed to cool, to about room temperature, and three or four volumes of water are added; whereupon the desired 3,4(2'-methyl-2'-methoxy-4'-methyl) dihydropyranocoumarin separates out as a solid, and is recovered by decantation or filtration. It may be purified by recrystallization from ethanol. The yield is about 29%. The purified product melts at 124° C. On analysis it shows the following:

Formula, $C_{15}H_{16}O_4$; carbon, calculated 69.2%, found 69.4%; hydrogen, calculated 6.2%, found 6.0%; methoxyl, calculated 11.9%, found 11.6%.

The reaction for forming it is indicated by the following equation:

(5)
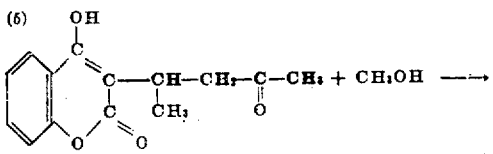

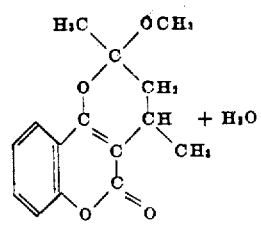

In the process of this example, we may use other alcohols than methyl alcohol—for instance, ethyl alcohol. The final product corresponds to that shown as obtained in Formula 5, save that R''' is the ethyl group instead of the methyl group.

*Example 2.—3,4-(2'-phenyl-2'methoxy-4'-phenyl)dihydropyranocoumarin*

The process of Example 1 is repeated, save that instead of using 3-(1'-methyl-2'-acetyl)ethyl-4-hydroxycoumarin to react with the methyl alcohol we use 3-(1'-phenyl-2'-benzoyl)ethyl-4-hydroxycoumarin, which may be prepared (as set forth in our aforesaid co-pending application) by condensing 4-hydroxycoumarin with benzalacetophenone in pyridine, and that the refluxing is continued for about twenty hours, and that the yield is about 13%. The product obtained is the desired 3,4-(2'-phenyl-2'-methoxy-4'-phenyl)dihydropyranocoumarin, and melts at about 205° C. On analysis it shows the following:

Formula, $C_{22}H_{20}O_4$; carbon, calculated 78.1%, found 77.9%; hydrogen, calculated 5.2%, found 5.4%; methoxyl, calculated 8.1%, found 8.4%.

The reaction is represented as follows:

(6)
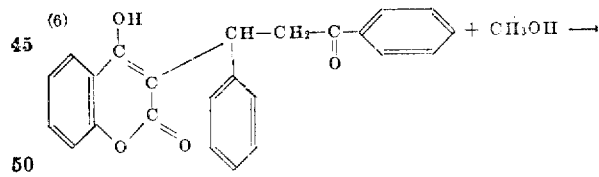

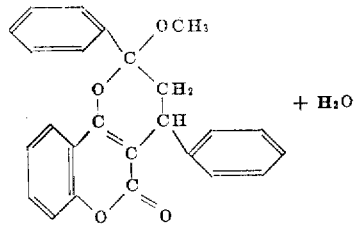

In the process of this example, we may use other alcohols than methyl alcohol—for instance, ethyl alcohol. The final product corresponds to that shown as obtained in Formula 6, save that R''' is the ethyl group instead of the methyl group.

*Example 3.—3,4-(2'-methyl-2'-methoxy-4'-phenyl)dihydropyranocoumarin*

Example 1 is repeated, save that instead of 3-(1'-methyl-2'-acetyl)ethyl-4-hydroxycoumarin we use 3-(1'-phenyl-2'-acetyl)ethyl-4-hydroxycoumarin, prepared (as set forth in our aforesaid co-pending application) by condensing 4-hydroxycoumarin with benzalacetone in pyridine, and that the refluxing needs to be continued only for about one-quarter hour, and that the yield is about 83%. The product obtained is the desired 3,4-(2'-methyl - 2' - methoxy - 4' - phenyl) dihydropyranocoumarin, and melts at about 166° C. On analysis it shows the following:

Formula, $C_{20}H_{18}O_4$: carbon, calculated 74.5%, found 74.5%; hydrogen, calculated 5.6%, found 5.9%; methoxyl, calculated 9.6%, found 9.5%.

The reaction is represented as follows:

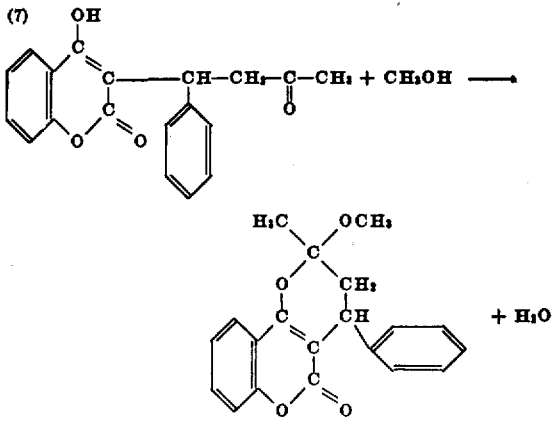

In the process of this example, as in that of other examples, we may use other alcohols than methyl alcohol—for example, ethyl alcohol. When ethyl alcohol is used, the product obtained is 3,4-(2'-methyl-2'-ethoxy-4'-phenyl) dihydropyranocoumarin, which melts at 177° C.

*Example 4.—3,4-(2' - methyl-2' - methoxy - 4'- phenyl) dihydropyranocoumarin — alternative method*

As has already been noted, it is not necessary to start with the separated 3-substituted 4-hydroxycoumarin in order to obtain the desired reaction with alcohol. As an example of this, we may prepare the same product as that obtained in Example 3 without starting with the separated 3-(1'-phenyl - 2' - acetyl) ethyl - 4 - hydroxycoumarin. To do this, we may dissolve equimolar portions of 4-hydroxycoumarin and benzalacetone in about ten times their combined weight of absolute methanol containing 3% hydrochloric acid. This mixture is refluxed for about 24 hours; and then water is added to the hot reaction mixture until a slight turbidity appears. Then the whole is cooled to about 0° C. and allowed to stand there about twenty-four to forty-eight hours. In that time some crystalline material will have separated, and it is collected by filtration. It is the 3,4-(2'-methyl-2'-methoxy-4'-phenyl) dihydropyranocoumarin, having the same properties and substantially the same analysis as the same product obtained by the process of Example 3.

*Example 5.—3,4-(2'-methyl-2'-methoxy-4'-anisyl) dihydropyranocoumarin*

The process of Example 1 is repeated, save that instead of using 3-(1'-methyl-2'-acetyl) ethyl-4-hydroxycoumarin to react with the methyl alcohol we use 3-(1'-anisyl-2'-acetyl)ethyl-4-hydroxycoumarin, which may be prepared (as set forth in our aforesaid co-pending application) by condensing 4-hydroxycoumarin with anisalacetone in pyridine, and that the refluxing is continued for about four hours, and that the yield is about 75%. The product obtained is the desired 3,4-(2'-methyl-2'-methoxy-4' - phenyl) dihydropyranocoumarin, and melts at about 163° C. On analysis it shows the following:

Formula, $C_{21}H_{20}O_5$: carbon, calculated 71.6%, found 71.5%; hydrogen, calculated 5.7%, found 5.8%; methoxyl, calculated 17.6%, found 16.7%.

The reaction is represented as follows:

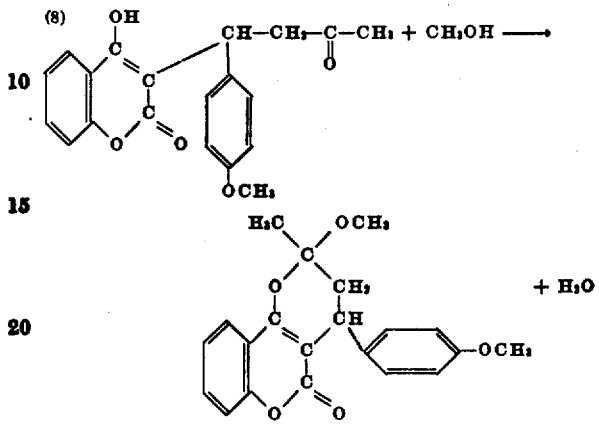

In the process of this example, we may use other alcohols than methyl alcohol—for instance, ethyl alcohol. The final product corresponds to that shown as obtained in Formula 8, save that R''' is the ethyl group instead of the methyl group.

*Example 6.—3,4-[2'-methyl-2'-methoxy-4'-(p-hydroxy-m-methoxyphenyl)]dihydropyranocoumarin*

The process of Example 1 is repeated, save that instead of using 3-(1'-methyl-2'-acetyl) ethyl-4-hydroxycoumarin to react with the methyl alcohol we use 3-[1'-(p-hydroxy-m-methoxyphenyl)-2'-acetyl]ethyl-4-hydroxycoumarin, which may be prepared (as set forth in our aforesaid copending application) by condensing 4-hydroxycoumarin with vanillylalacetone in pyridine, and that the refluxing need be continued for only about one hour, and that the yield is about 82%. The product obtained is the desired 3,4-[2'-methyl-2'-methoxy-4'-(p-hydroxy-m - methoxyphenyl)]dihydropyranocoumarin, and melts at about 187° C. On analysis it shows the following:

Formula: $C_{21}H_{20}O_6$: carbon, calculated 68.5%, found 68.6%; hydrogen, calculated 5.5%, found 5.6%; methoxyl, calculated 16.8%, found 16.5%.

The reaction is represented as follows:

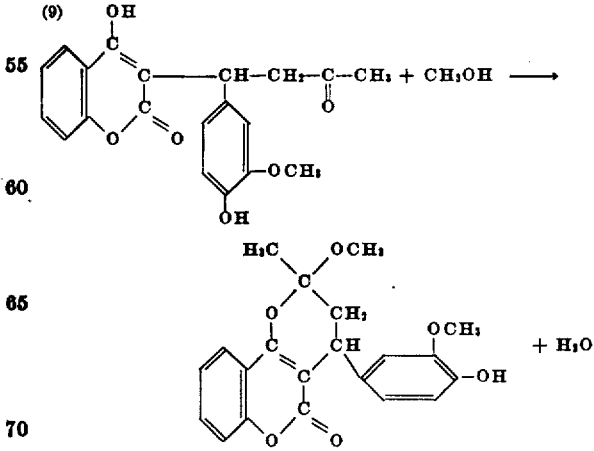

In the process of this example, we may use other alcohols than methyl alcohol—for instance, ethyl alcohol. The final product corresponds to that shown as obtained in Formula 9, save that R'''  is the ethyl group instead of the methyl group.

*Example 7.—3,4-(2'-salicyl-2'-methoxy-4'-phenyl) dihydropyranocoumarin*

The process of Example 1 is repeated, save that instead of using 3-(1'-methyl-2'-acetyl) ethyl-4-hydroxycoumarin to react with the methyl alcohol we use 3-(1'-phenyl-2'-salicylyl) ethyl-4-hydroxycoumarin, which may be prepared (as set forth in our aforesaid co-pending application) by condensing 4-hydroxycoumarin with benzal-o-hydroxyacetophenone in pyridine, and that the refluxing need be continued for only about one hour, and that the yield is about 50%. The product obtained is the desired 3,4-(2'-salicyl-2'-methoxy-4'-phenyl) dihydropyranocoumarin, and melts with decomposition at about 194° C. On analysis it shows the following:

Formula, $C_{25}H_{20}O_5$; carbon, calculated 75.0%, found 74.9%; hydrogen, calculated 5.0%, found 5.1%; methoxyl, calculated 7.7%, found 7.6%.

The reaction is represented as follows:

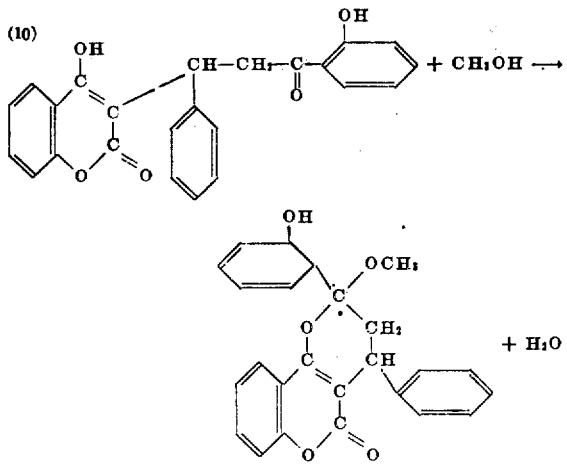

In the process of this example, we may use other alcohols than methyl alcohol—for instance, ethyl alcohol. The final product corresponds to that shown as obtained in Formula 10, save that R''' is the ethyl group instead of the methyl group.

The compounds of this application all have anticoagulant activity on oral administration. Their anticoagulant indexes are in general fairly close to those of the 3-substituted 4-hydroxycoumarins from which they are derived by reaction with an alcohol.

We claim as our invention:

1. The new 3,4-dihydropyranocoumarins, having the following general formula:

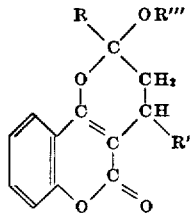

in which R represents a member of class consisting of alkyl groups, the phenyl group, and hydroxy-substituted phenyl groups; R' represents a member of the class consisting of alkyl groups, the phenyl group, and phenyl groups containing a substituent of the class consisting of the hydroxy group and the methoxy group in at least one of the para and meta positions; and R''' represents a lower-alkyl group.

2. The new 3,4-dihydropyranocoumarins as set forth in claim 1, in which R is methyl.

3. The new 3,4-dihydropyranocoumarins as set forth in claim 1, in which R' is phenyl.

4. The new 3,4-dihydropyranocoumarins as set forth in claim 1, in which R' is a methoxyphenyl.

5. The new 3,4-dihydropyranocoumarins as set forth in claim 1, in which R' is p-methoxyphenyl.

6. The new 3,4-dihydropyranocoumarins as set forth in claim 1, in which R' is p-hydroxy-m-methoxyphenyl.

7. The new 3,4-dihydropyranocoumarins as set forth in claim 1, in which R is methyl and R' is phenyl.

8. The new 3,4-dihydropyranocoumarins as set forth in claim 1, in which R is methyl and R' is a methoxyphenyl.

9. The new 3,4-dihydropyranocoumarins as set forth in claim 1, in which R is methyl and R' is p-methoxyphenyl.

10. The new 3,4-dihydropyranocoumarins as set forth in claim 1, in which R is methyl and R' is p-hydroxy-m-methoxyphenyl.

11. The process of making 3,4-dihydropyranocoumarins, of the following general formula:

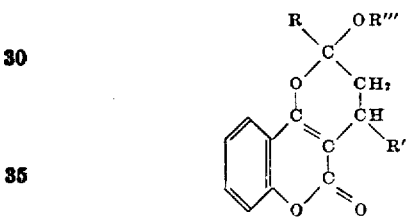

in which R represents a member of the class consisting of alkyl groups, the phenyl group, and hydroxy-substituted phenyl groups; R' represents a member of the class consisting of alkyl groups, the phenyl group, and phenyl groups containing a substituent of the class consisting of the hydroxy group and the methoxy group in at least one of the para and meta positions; and R''' represents a lower-alkyl group; which consists in reacting with an alcohol of the following general formula:

R'''OH in which R''' represents an alkyl group, a 3-substituted 4-hydroxycoumarin of the following general formula:

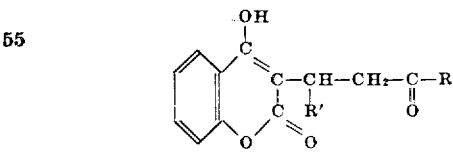

in which R and R' have the same meaning as before.

12. The process of making 3,4-dihydropyranocoumarins as set forth in claim 11, in which R is methyl.

13. The process of making 3,4-dihydropyranocoumarins as set forth in claim 11, in which R' is phenyl.

14. The process of making 3,4-dihydropyranocoumarins as set forth in claim 11, in which R' is a methoxyphenyl.

15. The process of making 3,4-dihydropyranocoumarins as set forth in claim 11, in which R' is p-methoxyphenyl.

16. The process of making 3,4-dihydropyranocoumarins as set forth in claim 11, in which R' is p-hydroxy-m-methoxyphenyl.

17. The process of making 3,4-dihydropyranocoumarins as set forth in claim 11, in which R is methyl and R' is phenyl.

18. The process of making 3,4-dihydropyranocoumarins as set forth in claim 11, in which R is methyl and R' is a methoxyphenyl.

19. The process of making 3,4-dihydropyranocoumarins as set forth in claim 11, in which R is methyl and R' is p-methoxyphenyl.

20. The process of making 3,4-dihydropyranocoumarins as set forth in claim 11, in which R is methyl and R' is p-hydroxy-m-methoxyphenyl.

MARK A. STAHMANN.
MIYOSHI IKAWA.
KARL PAUL LINK.

REFERENCES CITED

The following references are of record in the file of this patent:

Journal of American Chemical Society, 65 (1943), pp. 2285-7, 2288-91, 2292-4.

---

Certificate of Correction

Patent No. 2,427,579. September 16, 1947.

MARK A. STAHMANN ET AL.

It is hereby certified that errors appear in the printed specification of the above numbered patent requiring correction as follows: Column 1, line 13, for that portion of the formula reading "R$_1$" read R'; column 4, line 40, Example 2, for "C$_{22}$H$_{20}$O$_4$" read C$_{25}$H$_{20}$O$_4$; and that the said Letters Patent should be read with these corrections therein that the same may conform to the record of the case in the Patent Office:

Signed and sealed this 18th day of November, A. D. 1947.

[SEAL]

THOMAS F. MURPHY,
*Assistant Commissioner of Patents.* coumarins as set forth in claim 11, in which R' is p-hydroxy-m-methoxyphenyl.
17. The process of making 3,4-dihydropyranocoumarins as set forth in claim 11, in which R is methyl and R' is phenyl.
18. The process of making 3,4-dihydropyranocoumarins as set forth in claim 11, in which R is methyl and R' is a methoxyphenyl.
19. The process of making 3,4-dihydropyranocoumarins as set forth in claim 11, in which R is methyl and R' is p-methoxyphenyl.
20. The process of making 3,4-dihydropyranocoumarins as set forth in claim 11, in which R is methyl and R' is p-hydroxy-m-methoxyphenyl.

MARK A. STAHMANN.
MIYOSHI IKAWA.
KARL PAUL LINK.

REFERENCES CITED

The following references are of record in the file of this patent:

Journal of American Chemical Society, 65 (1943), pp. 2285-7, 2288-91, 2292-4.

Certificate of Correction

Patent No. 2,427,579. September 16, 1947.

MARK A. STAHMANN ET AL.

It is hereby certified that errors appear in the printed specification of the above numbered patent requiring correction as follows: Column 1, line 13, for that portion of the formula reading "R₁" read R'; column 4, line 40, Example 2, for "$C_{22}H_{20}O_4$" read $C_{25}H_{20}O_4$; and that the said Letters Patent should be read with these corrections therein that the same may conform to the record of the case in the Patent Office:

Signed and sealed this 18th day of November, A. D. 1947.

[SEAL]

THOMAS F. MURPHY,
*Assistant Commissioner of Patents.*